May 5, 1942.  T. R. CAMP  2,281,826
FLOW CONTROL APPARATUS
Filed Feb. 17, 1938  2 Sheets-Sheet 1
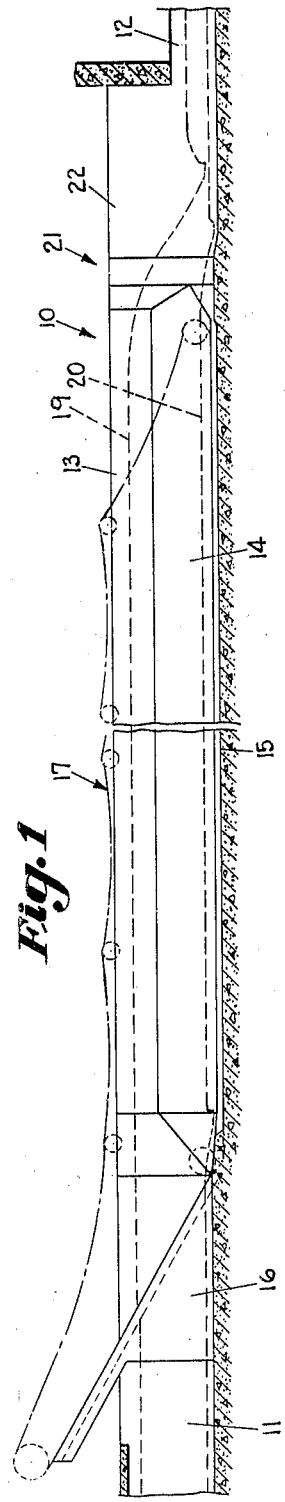
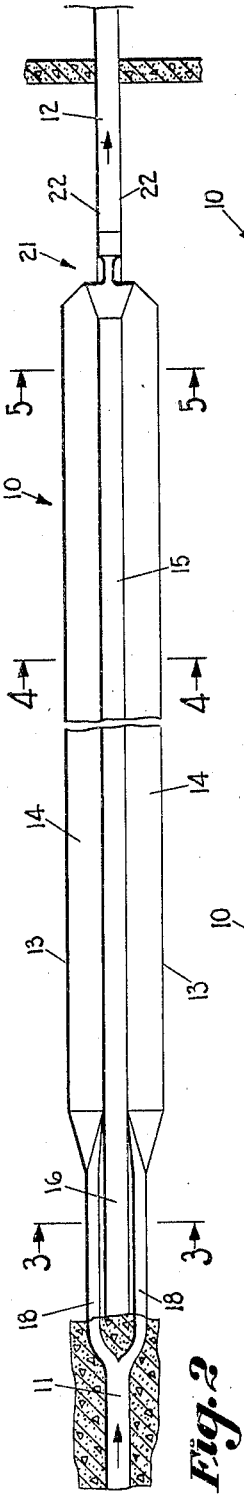
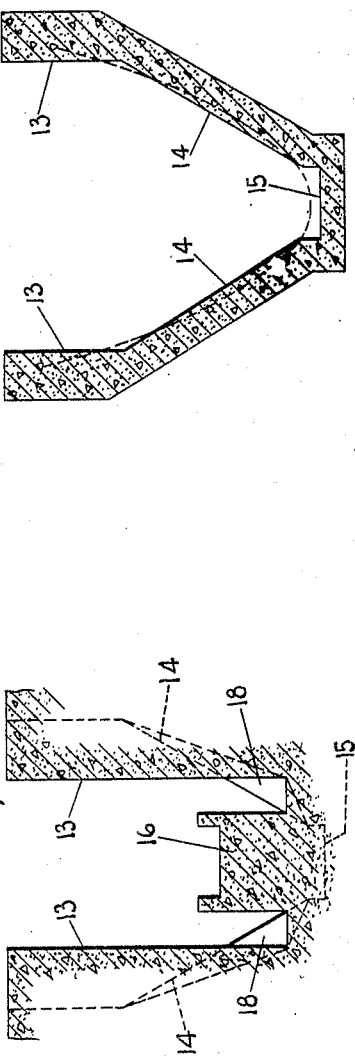
INVENTOR:
THOMAS R. CAMP,
BY
Chas. M. Nissen,
ATT'Y.

May 5, 1942. T. R. CAMP 2,281,826
FLOW CONTROL APPARATUS
Filed Feb. 17, 1938 2 Sheets-Sheet 2
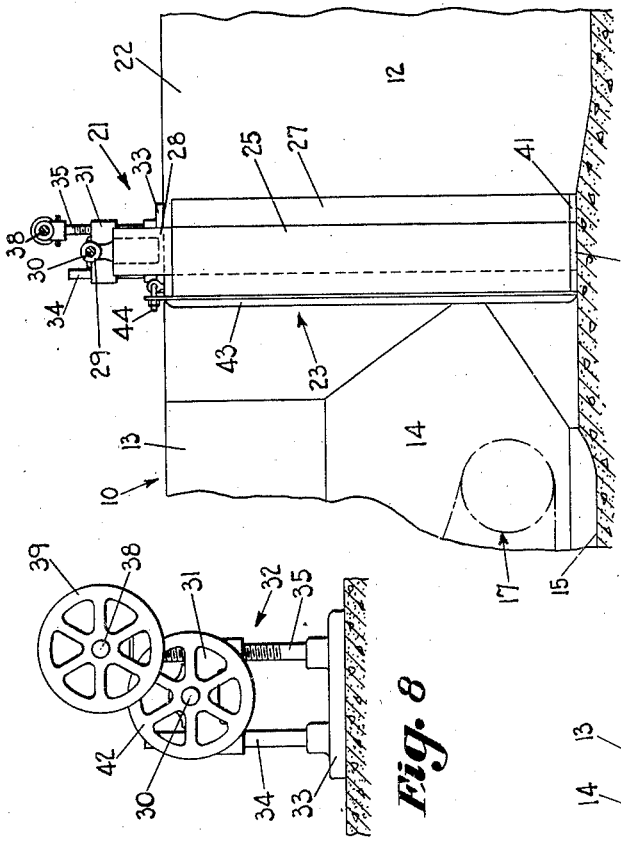
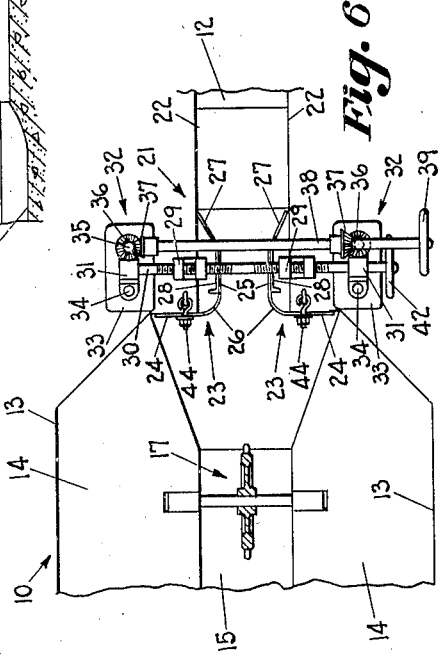
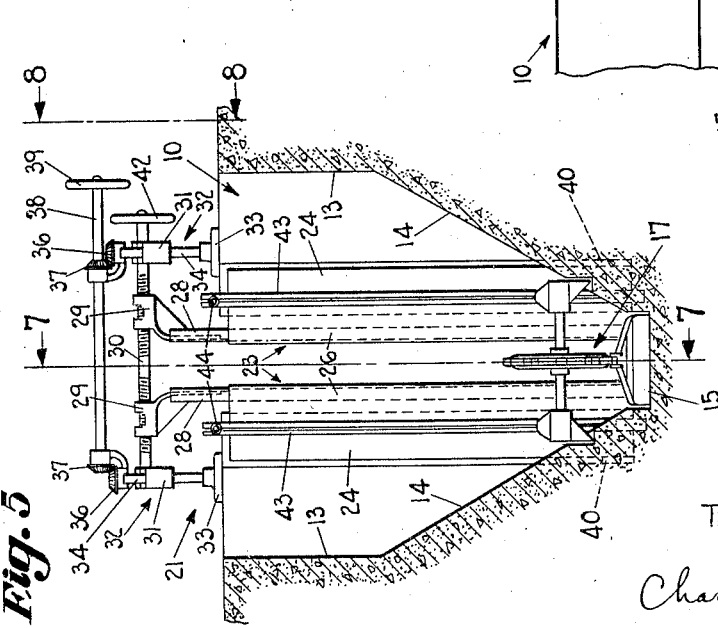
INVENTOR:
THOMAS R. CAMP,
BY
Chas. M. Nissen,
ATTY.

Patented May 5, 1942

2,281,826

UNITED STATES PATENT OFFICE 2,281,826

FLOW CONTROL APPARATUS

Thomas R. Camp, Newton, Mass.

Application February 17, 1938, Serial No. 190,967

16 Claims. (Cl. 210—55)

This invention relates to fluid control apparatus and more particularly to means for adjustably regulating the size and more particularly the width of an adjustable control weir or notch so designed as to maintain substantially automatically a selected predetermined constant velocity of flow of the fluid through the reservoir, tank, sluiceway or channel for varying volume of flow.

Another object of the invention is to provide a control apparatus in a system of the above mentioned type in which the velocity of flow of the fluid through the reservoir, tank, sluiceway or channel may be varied to produce the most desirable results due to any changing conditions which may be encountered and to make it unnecessary to know accurately the magnitude of the discharge coefficient of the control weir when the apparatus is originally designed.

Other objects of the invention will appear hereinafter, the novel features and combinations being set forth in the appended claims.

In the accompanying drawings,

Fig. 1 is a longitudinal sectional elevational view of a grit channel of a sewage system showing diagrammatically the conveyor mechanism associated therewith for removing the settled grit;

Fig. 2 is a plan view of the grit channel of Fig. 1 with the conveyor apparatus removed;

Fig. 3 is a transverse sectional elevational view taken on the line 3—3 of Fig. 2 looking in the direction of the arrows;

Fig. 4 is a transverse sectional elevational view taken on the line 4—4 of Fig. 2 looking in the direction of the arrows;

Fig. 5 is a transverse sectional elevational view taken on the line 5—5 of Fig. 2 looking in the direction of the arrows, and showing more particularly the adjustable control weir in elevation;

Fig. 6 is a plan view of the control weir adjusting mechanism;

Fig. 7 is an elevational view taken on the line 7—7 of Fig. 5 looking in the direction of the arrows; and Fig. 8 is an elevational view taken on the line 8—8 of Fig. 5 looking in the direction of the arrows.

In my Patent No. 2,025,722 for Flow control apparatus dated December 31, 1935, I have shown a method and apparatus for controlling the flow of liquid through a reservoir, tank, sluiceway or channel which is so constructed in connection with a control section associated with the effluent or efflux end thereof as to maintain a selected predetermined substantially constant velocity of liquid flow through the reservoir, tank, sluiceway or channel for all rates of discharge.

Due to practical conditions which arise in the construction of apparatus of this type it has been found that there is sometimes a variation between the theoretical most desired velocity of fluid flow through the reservoir, tank, sluiceway or channel and that found in practice to be the best. Furthermore, it has been found that due to varying conditions of the fluid being treated, such as content and character of solid matter, as well as numerous other variables, a change in the fluid velocity over that previously calculated or otherwise determined, is desirable.

It is still further to be noted that the above mentioned varying conditions may make it desirable to change the fluid velocity from time to time. In the present application I have, therefore, provided mechanism to adjust the area of the control weir and in the illustrated embodiment of my invention this is effected by controlling the width of the rectangularly shaped opening, the vertical walls of which are maintained substantially in their vertical positions at all times.

This adjustable control weir furthermore makes it unnecessary to know accurately beforehand the magnitude of the discharge coefficient of the control weir for the adjustment of the width of the control weir may be made to compensate for any reasonable variations therein from that assumed in the deign of the apparatus.

Referring to the accompanying drawings, I have illustrated the apparatus in association with a grit channel of a sewage disposal system, but it is to be understood that the application is not to be so restricted although the apparatus does find one of its most useful applications in combination therewith. A longitudinally extending settling or grit channel or chamber 10 is provided and preferably formed as a monolith of poured concrete having a sewage influent or influx opening 11 at one end thereof and an effluent or efflux opening 12 at the other end thereof. It will, of course, be evident that the grit containing sewage will flow into the grit channel 10 by way of said influent opening 11 and from said grit channel 10 by way of said effluent opening 12.

The main portion of the grit channel 10 is formed by a pair of side walls 13, 13 which taper downwardly at 14, 14 to a bottom wall 15 along which the flights of an endless scraper conveyor 17 or other means for grit removal are adapted to travel and move from the position near the effluent end of said grit channel toward the influent end thereof. Adjacent to said influent end is an upwardly inclined ramp 16 up which the settled grit is adapted to be scraped by the continuous scraper conveyor 17. It will be noted by reference to Figs. 2 and 3 of the drawings that the influent sewage flows through branch channels 18, 18 on opposite sides of the ramp 16 to deliver the sewage to the main body of the grit channel 10.

The maximum liquid level in the grit channel 10 is illustrated by the dotted line 19 in Fig. 1, which line 19 also indicates the head of the liquid after it flows from the grit channel 10 and into the effluent opening 12. The dotted line 20 indicates a much lower rate of flow of liquid through the grit channel 10. As previously indicated, in the apparatus of my invention the velocity of flow of the liquid will be substantially the same regardless of the liquid level in the grit channel 10 though, of course, the amount or rate of fluid flow will vary with the height of the liquid therein.

Adjacent to the effluent end of said grit channel 10 I provide an adjustable control weir 21 comprising mechanism for adjusting the width of said weir section so that if the velocity for which the grit channel is designed is not found to procure the desired results it is possible to change this velocity in proportion to the amount of change provided for in the width of the control weir. Furthermore, this adjustment provides for changing the velocity of the fluid in the grit channel to compensate for varying conditions which may be encountered in practice. Still further, this control weir provides for an adjustment of the size thereof so that it is not necessary to know accurately beforehand the magnitude of the discharge coefficient for said control weir.

The mechanism forming said adjusting control weir is best illustrated in Figs. 5 to 8, inclusive, of the drawings, to which attention is now directed. Adjacent to the adjustable control weir 21 the grit channel 10 has its width progressively reduced leading to said adjustable control weir from which the vertical side walls 22, 22 of the effluent opening 12 extend which are spaced apart a relatively small amount as compared to the width of said grit channel 10. The side walls 22, 22 are formed as a monolith of poured concrete with said grit channel 10. Between said side walls 22, 22 is placed a pair of spaced-apart curved upright members or guide plates 23, 23 which have forward flanges 24, 24 adapted to abut front right angle portions of the side walls 22.

The guide plates 23, 23 also have longitudinally extending flanges 25, 25 which are formed integral with the forward flanges by smooth curved portions 26, 26 clearly illustrated in Fig. 6 of the drawings. Adjacent to their rear or discharge ends the longitudinal flanges 25, 25 are flared outwardly, as seen at 27, 27, and when said guide plates 23, 23 are spaced apart the maximum distance said outwardly flared portions 27, 27 contact the side walls 22, 22 of the effluent opening 12.

The guide plates 23, 23 are mounted upon heavy spaced apart channels 28, 28 to the tops of which are rigidly attached brackets 28, 29 (see Fig. 5) which are threaded onto a threaded operating shaft 30 which is reversely threaded at opposite sides of the central portion thereof so that when said shaft 30 is rotated, as hereinafter described, the brackets 29, 29 and, as a consequence, the guide plates 23, 23 will move in opposite directions, either toward or from each other.

The shaft 30 is journaled upon a pair of vertically adjustable journal blocks 31, 31 wihch, in turn, are supported for adjustment upon a pair of spaced standards 32, 32 which provide a jack mechanism for the complete adjustable control weir mechanism. The structures of the two standards 32 are substantially the same and are illustrated best in Fig. 8 of the drawings to which attention is now directed.

Each of said standards 32 is formed by a base 33 to which are attached upwardly extending guide rod 34 and threaded adjusting rod 35 which pass through plain and threaded bores respectively in the journal blocks 31. To effect vertical adjustment of said journal blocks 31 and the adjustable control mechanism associated therewith the upper ends of said adjusting rods 35 carry bevel pinions 36, 36 which mesh with operating pinions 37, 37 keyed to a shaft 38 operated by handwheel 39. The bottom ends of the adjusting rods 35 are rotatably mounted in the bases 33.

It is thus evident that by operating the handwheel 39 the two threaded adjusting rods may be rotated to adjust vertically the entire adjustable control weir mechanism 21. This is to provide for the free adjustment of the guide plates 23, 23 toward and from each other and when they are adjusted to any desired position they may be moved downwardly in a positive manner through appropriate vertical slots 40, 40 in the walls 14, 14 adjacent the bottom of the grit channel 10 thereby to insure that the liquid in the grit channel 10 all flows between the longitudinal flanges 25 of said guide plates 23 to provide flow in accordance with a known equation as set forth in the above mentioned patent.

Also to prevent any undesired leakage there is associated with the bottom of the guide plates 23 a flexible seal 41, best illustrated in Fig. 7 of the drawings, against which the bottoms of said guide plates 23 come in contact and compress on the bottom wall 15 of said grit channel 10.

It is also to be pointed out that the adjusting shaft 30 is provided with an operating handwheel 42 by which it is rotated in the journal blocks 31 to effect the aforementioned adjustment of the width of the adjustable control weir 21.

To insure further against any flow of fluid from the grit channel 10 except that which flows between the longitudinal flanges 25 of the guide plates 23 in accordance with a known formula or equation, I preferably associate with the forward flanges 24 thereof a pair of upright clamp bars 43, 43, the lower ends of which are received in appropriate notches in the bottom of the grit channel 10 and the upper ends of which are removably and adjustably clamped to the forward portions of side walls 22 by I-bolt clamping means 44, 44. The upper ends of the clamp bars 43 are preferably slotted so that the I-bolt clamping means 44, 44 may be removed therefrom without requiring complete removal of the nut thereof.

In the operation of the device comprising my invention the influent liquid, such as sewage which contains grit, flows into the grit channel 10 and flows therethrough at a predetermined velocity which is independent of the depth of the liquid therein. This velocity may be adjusted to obtain the most efficient settling of the grit, and at the same time to insure that most of the organic sewage solids due to their lighter weight are transported through and out of the grit chamber. It is, of course, evident that other solid bearing liquids may likewise be treated to separate the solids by differential settling.

As before mentioned, the adjusting mechanism for the adjustable control weir 21 makes possible the adjustment of the velocity of the liquid through the grit channel 10 to any value which is found to produce the most desirable results and to change this value of liquid velocity to compensate for changing conditions. Also, the adjustment makes it unnecessary to know accurately beforehand the magnitude of the discharge coefficient for the control weir 21.

Once the apparatus has been installed and adjusted for any particular type of solid bearing liquid to be treated it will not normally need to be further adjusted unless the nature of the liquid or the solid constituent thereof changes and makes desirable such adjustment. However, as previously mentioned, and as described particularly in the aforementioned patent, the design of the adjustable control section 21 and the construction of the grit channel are so related that for wide variations in the rate of fluid flow through the grit channel with the consequent relatively wide variation in the height or head of liquid therein, the velocity of the fluid therethrough will be substantially constant with the resulting substantially constant condition of solid separation.

Obviously those skilled in the art may make various changes in the details and arrangements of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In liquid flow control apparatus, the combination with a settling channel through which liquid having solid particles therein is adapted to flow while some of the solid particles settle, of means for removing settled solid particles from said channel, a discharge control weir comprising a pair of substantially vertical walls, and means for adjusting the effective distance between such vertical walls.

2. In liquid flow control apparatus, the combination with a settling channel adapted to receive a flowing stream of liquid having heavy solid particles in suspension some of which settle on the channel bottom, of conveyor means for removing said settled solids, a control weir disposed at the effluent end of said channel to maintain a substantially constant liquid velocity through said channel irrespective of the volume of flow, said weir comprising a pair of vertical walls adjustable as to effective spacing between them, and means for adjusting the spacing of said vertical walls from each other to effect a setting of said velocity at a value to produce the best differential settling efficiency in said settling channel.

3. In liquid flow control apparatus, the combination with a settling chamber adapted to receive a flowing stream of liquid having heavy solid particles in suspension some of which settle on the chamber bottom, of conveyor means for removing said settled solids, a control weir for maintaining a substantially constant liquid velocity through said chamber irrespective of the volume of flow, said weir comprising a pair of upright plates having vertical substantially equally spaced apart walls, means for adjusting said plates toward and from each other while keeping them equally spaced to effect adjustment of the control weir, and means for securing said plates in adjusted positions.

4. In liquid flow control apparatus, the combination with a settling channel through which liquid having solid particles therein is adapted to flow while some of the solid particles settle, of means for removing settled solids from said settling channel, a discharge control weir comprising a pair of equally spaced upright members defining a rectangular opening, a threaded shaft having reverse threads on adjacent parts, and individual connections between said upright members and reversely threaded parts of said shaft to effect adjustment of the spacing between said upright members upon rotation of said shaft.

5. In liquid flow control apparatus, the combination with a settling channel through which liquid having solid particles therein is adapted to flow while some of the solid particles settle, of means for removing settled solids from the settling channel, a discharge control weir comprising a pair of spaced-apart curved upright plates having alined laterally extending flanges and spaced longitudinal flanges forming spaced vertical walls for the weir, and means for adjusting the spacing between the longitudinal flanges.

6. In liquid flow control apparatus, the combination with a settling channel through which liquid having solid particles therein is adapted to flow while some of the solid particles settle, of means for removing settled solids from the settling channel, a discharge control weir comprising a pair of equally spaced upright members defining a rectangular opening having spaced-apart vertical walls extending upwardly from the bottom of said channel, and means for adjusting said upright members to adjust the effective distance between said vertical walls while keeping them equally spaced.

7. In liquid flow control apparatus, the combination with a settling channel through which liquid having solid particles therein is adapted to flow while some of the solid particles settle, of means for removing settled solids from said settling channel, a discharge control weir comprising equally spaced upright members defining a rectangular opening having substantially vertical walls, means for adjusting said upright members to adjust the effective distance between said vertical walls, and a flexible seal between the bottom of said channel and said upright members.

8. In liquid flow control apparatus, the combination with a settling channel through which liquid having solid particles therein is adapted to flow while some of the solid particles settle, of mechanism for removing settled solids from the bottom of said settling chamber, a discharge control weir comprising equally spaced upright members at the effluent end of the channel in position to form a rectangular opening having substantially vertical walls, means for adjusting said upright members to adjust the effective spacing between said vertical walls, and releasable mechanism for securing said upright members in adjusted positions.

9. In liquid flow control apparatus, the combination with a container having a sedimentation chamber through which a liquid containing suspended solid particles is adapted to flow, of conveyor mechanism for removing settled solid particles from the bottom of said chamber, a control weir for maintaining a substantially constant liquid velocity through said chamber irrespective of the volume of flow, said weir comprising a pair of upright plates having substantially equally spaced apart vertical walls parallel to the direction of flow of the liquid through the weir, diverging extensions of said plates at the effluent end of said weir, and mechanism for adjusting said plates to vary the equal spacing between said upright walls.

10. In liquid flow control apparatus, the combination with a settling channel through which liquid having solid particles therein is adapted to flow while some of the solid particles settle, of conveyor mechanism for removing settled solid particles from the bottom of said channel, a discharge control weir comprising a pair of upright plates forming equally spaced upright walls of a rectangular opening extending upwardly from the bottom of the said channel, lateral extensions from said plates at the influent side of said weir, and means for adjusting said plates to vary the distance between said walls while keeping them equally spaced.

11. In liquid control apparatus, the combination with a settling channel through which liquid having solid particles therein is adapted to flow while some of the solid particles settle, of means for removing settled solids from said settling channel, a discharge control weir comprising a pair of spaced upright members defining a rectangular opening, means for adjusting said members to vary the horizontal distance between them comprising a shaft having reverse threads on adjacent parts, a pair of threaded brackets, one received by each of said adjacent reverse shaft threads, means connecting each bracket to one of said spaced upright members, and means for rotating said shaft to effect reverse movements of said spaced upright members.

12. In liquid control apparatus, the combination with a settling channel through which liquid having solid particles therein is adapted to flow while some of the solid particles settle, of means for removing settled solids from said settling channel, a discharge control weir comprising a pair of spaced upright members defining a rectangular opening, means for adjusting said members to vary the horizontal distance between them comprising a shaft having reverse threads on adjacent parts, a pair of threaded brackets, one received by each of said adjacent reverse shaft threads, means connecting each bracket to one of said spaced upright members, means for vertically adjusting said spaced upright members while they are held in fixed relation relative to each other, and means for rotating said shaft to effect reverse movements of said spaced upright members.

13. In liquid flow control apparatus, the combination with a container having a sedimentation chamber through which a liquid containing suspended solids is adapted to flow, of a control weir associated with such chamber and adapted to control the flow of liquid through said chamber at a velocity to effect differential settling of said solids, means for removing settled solids from said container, and means for adjusting the effective size of said weir to provide for the most efficient settling of said solids comprising means for adjusting at least one member of said weir in both an upright and a lateral direction each independently of the other.

14. In liquid flow control apparatus, the combination with a container having a sedimentation chamber through which a liquid containing suspended solids is adapted to flow, of a control weir associated with such chamber and adapted to control the flow of liquid through said chamber at a velocity to effect differential settling of said solids, means for removing settled solids from said container, and means for adjusting the effective size of said weir to provide for the most efficient settling of said solids comprising means for adjusting at least one member of said weir in both an upright and a lateral direction.

15. In liquid flow control apparatus, the combination with a settling channel adapted to receive a flowing stream of liquid having heavy solid particles in suspension some of which settle on the channel bottom, of conveyor means for removing said settled solids, a control weir disposed at one end of said channel to maintain a substantially constant liquid velocity through said channel irrespective of the volume of flow, said weir including a pair of vertical walls at least one of which is adjustable relative to the other and also adjustable vertically, means for adjusting said one wall vertically, and means for adjusting it relative to the other wall.

16. In liquid flow control apparatus, the combination with a settling channel adapted to receive a flowing stream of liquid having heavy solid particles in suspension some of which settle on the channel bottom, of conveyor means for removing said settled solids, a control weir disposed at one end of said channel to maintain a substantially constant liquid velocity through said channel irrespective of the volume of flow, said weir including a pair of vertical walls at least one of which is adjustable relative to the other and also adjustable vertically, and means for adjusting said one wall in parallelism relative to the other wall.

THOMAS R. CAMP.